United States Patent [19]

Collette et al.

[11] E Re. 29,274

[45] Reissued June 21, 1977

[54] MECHANICAL COUNTER

[75] Inventors: Richard L. Collette, Hoffman Estates; Frank S. Vojir, Berwyn; Roger E. Watts, Chicago, all of Ill.

[73] Assignee: Guardian Electric Manufacturing Company, Chicago, Ill.

[22] Filed: Dec. 11, 1975

[21] Appl. No.: 639,879

Related U.S. Patent Documents

Reissue of:

[64] Patent No.: 3,863,052
Issued: Jan. 28, 1975
Appl. No.: 452,183
Filed: Mar. 18, 1974

[52] U.S. Cl. ..... 235/91 R; 235/132 R; 235/132 A; 355/14

[51] Int. Cl.[2] ..... G06M 3/02

[58] Field of Search ..... 235/91 R, 132 R, 132 A; 355/14

[56] References Cited

UNITED STATES PATENTS

| | | | |
|---|---|---|---|
| 3,710,079 | 1/1973 | Cralle, Jr. et al. | 235/91 R |
| 3,731,874 | 5/1973 | Fowlie | 235/91 R |
| 3,873,198 | 3/1975 | Ettelbruck et al. | 235/132 A |

*Primary Examiner*—Stephen J. Tomsky

*Attorney, Agent, or Firm*—Allegretti, Newitt, Witcoff & McAndrews

[57] ABSTRACT

A counter device includes an outer annular dial which may be set to a desired detent position to indicate, for example, the number of copies required from a copying machine. A push button positioned at a null position within the annular dial may then be depressed to operate a control circuit initiating operation of the copying machine and simultaneously engage the counter mechanism of the counter device. The push button then moves incrementally to register with the setting on the annular dial, whereupon the counter device automatically terminates operation of the copying machine by opening the control circuit and simultaneously resets the push button to the null position.

The internal mechanism of the counter device includes a ratchet and pawl operated by an external drive from the copying machine. The ratchet and pawl are advanced in incremental steps to register with the preset detent position of the annular dial. The ratchet is then released and returned to its initial or the null position. Release of the ratchet simultaneously operates a switch to terminate operation of the ratchet advance mechanism. The device also includes a setting which renders the advance and counting mechanism inoperative so that the push button will be maintained in a depressed position to command operation of the copying machine until manually released.

42 Claims, 18 Drawing Figures

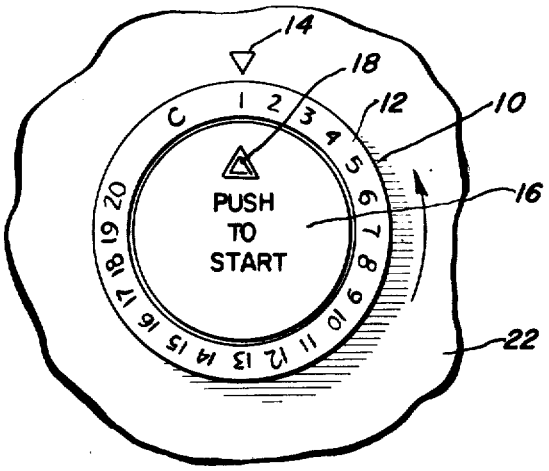
FIG. 3
FIG. 1
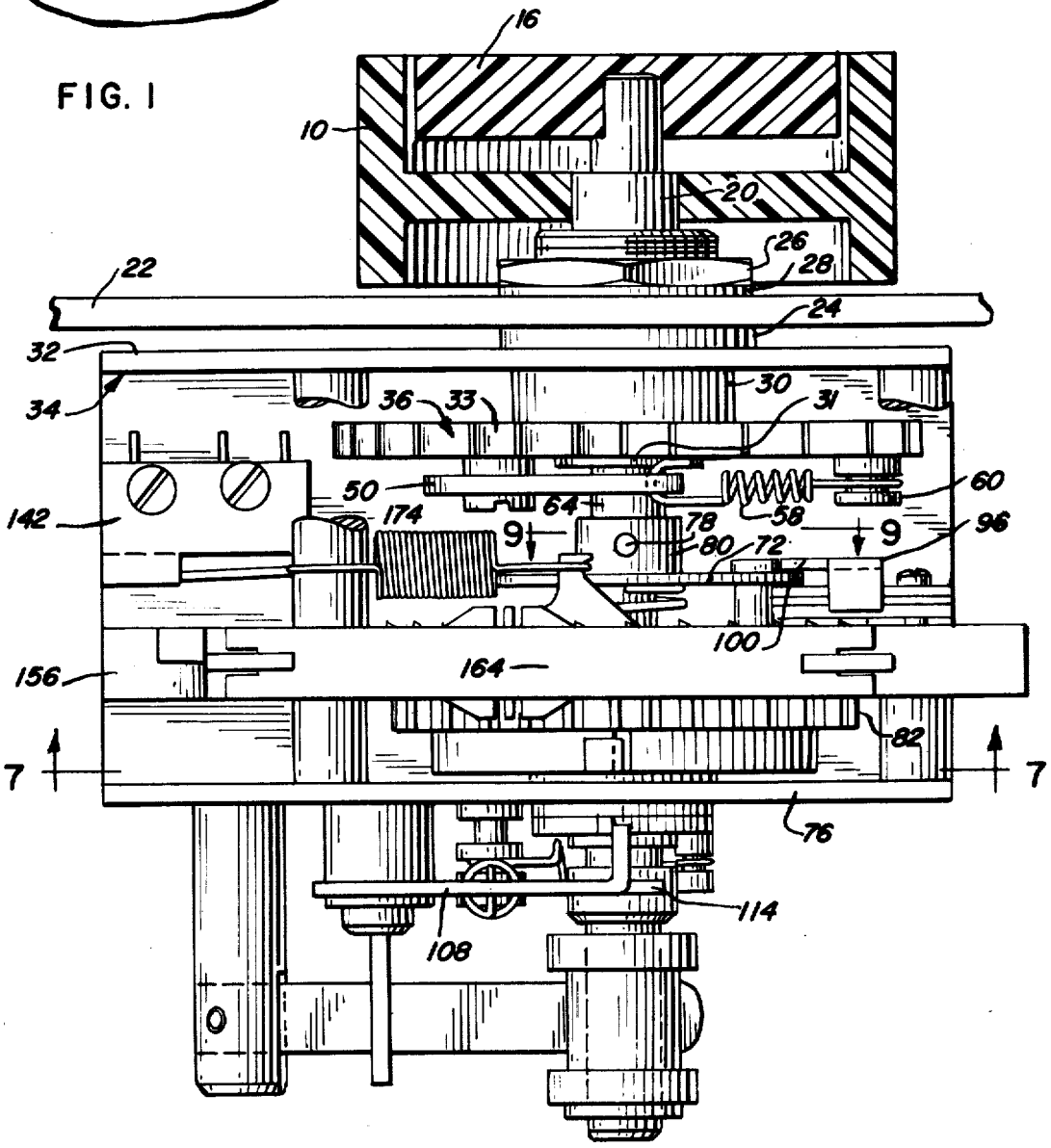

FIG. 4
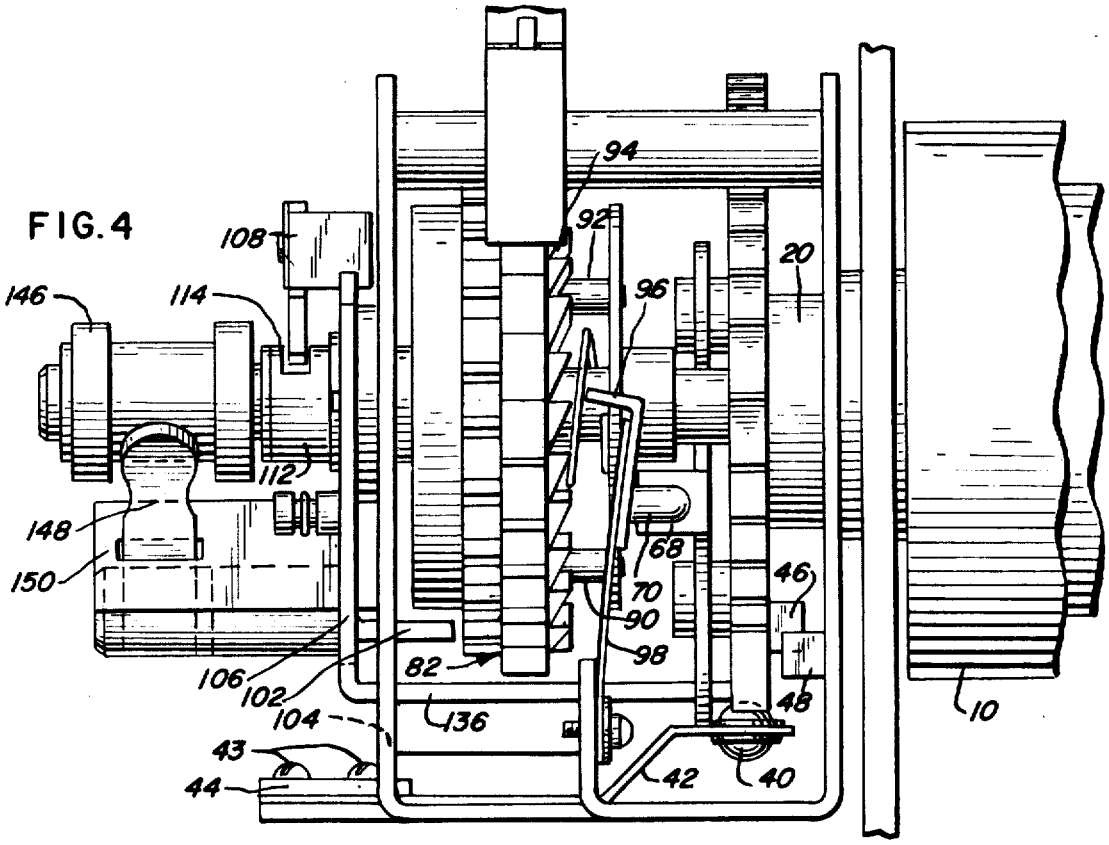
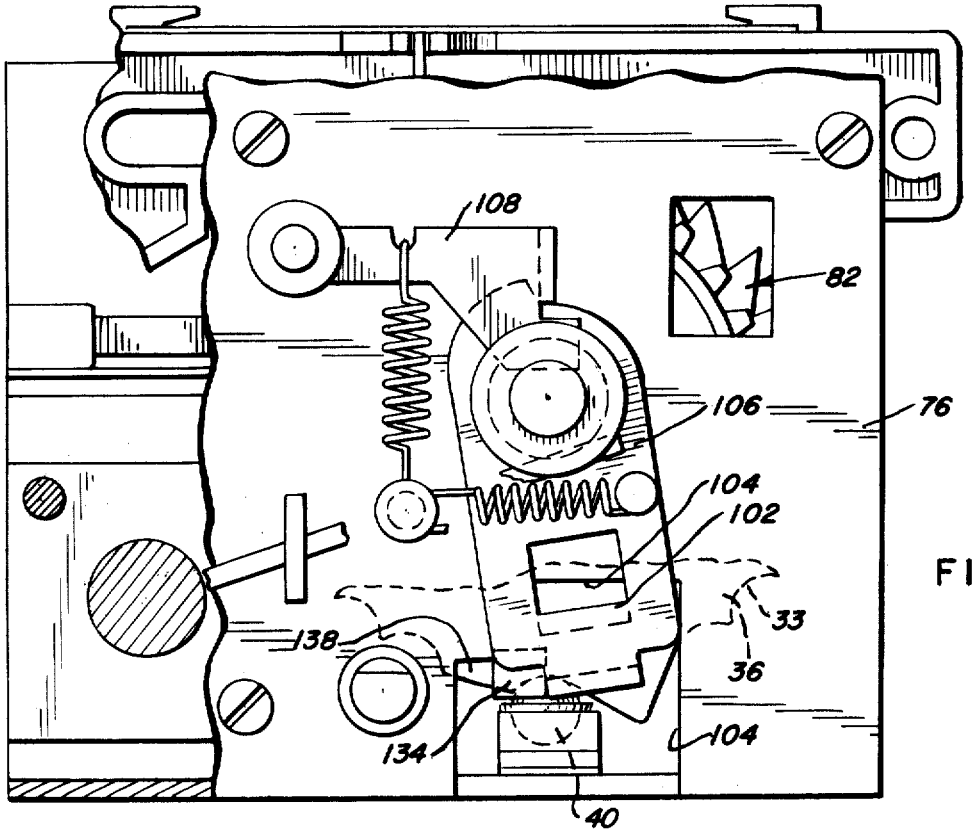
FIG. 5

FIG. 6
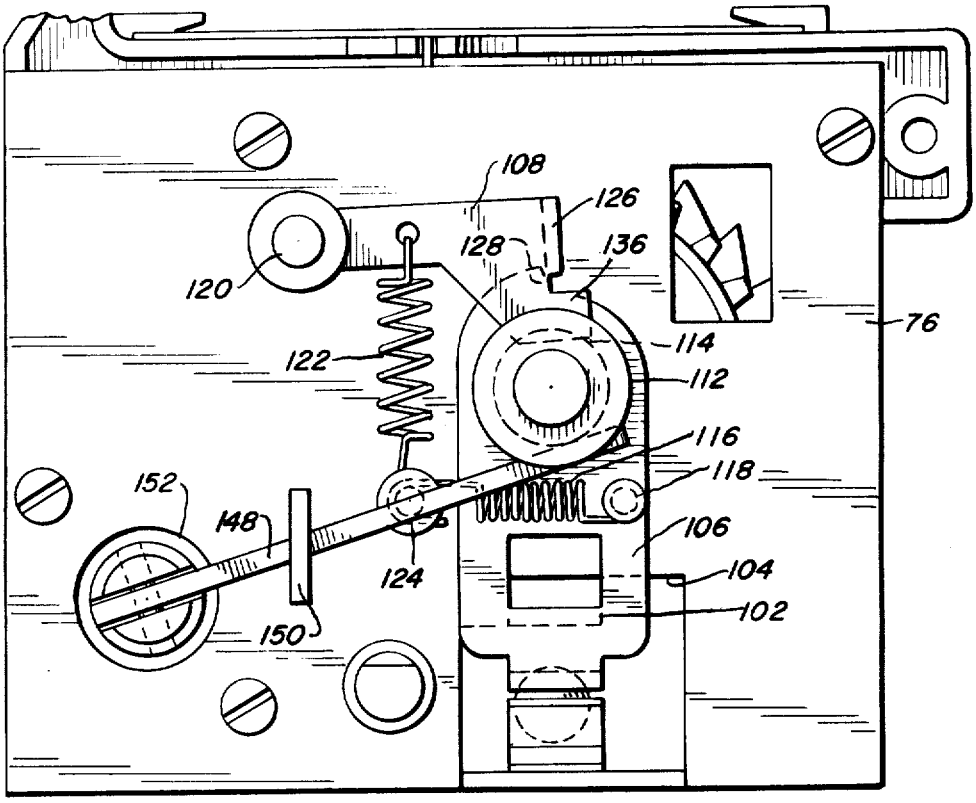
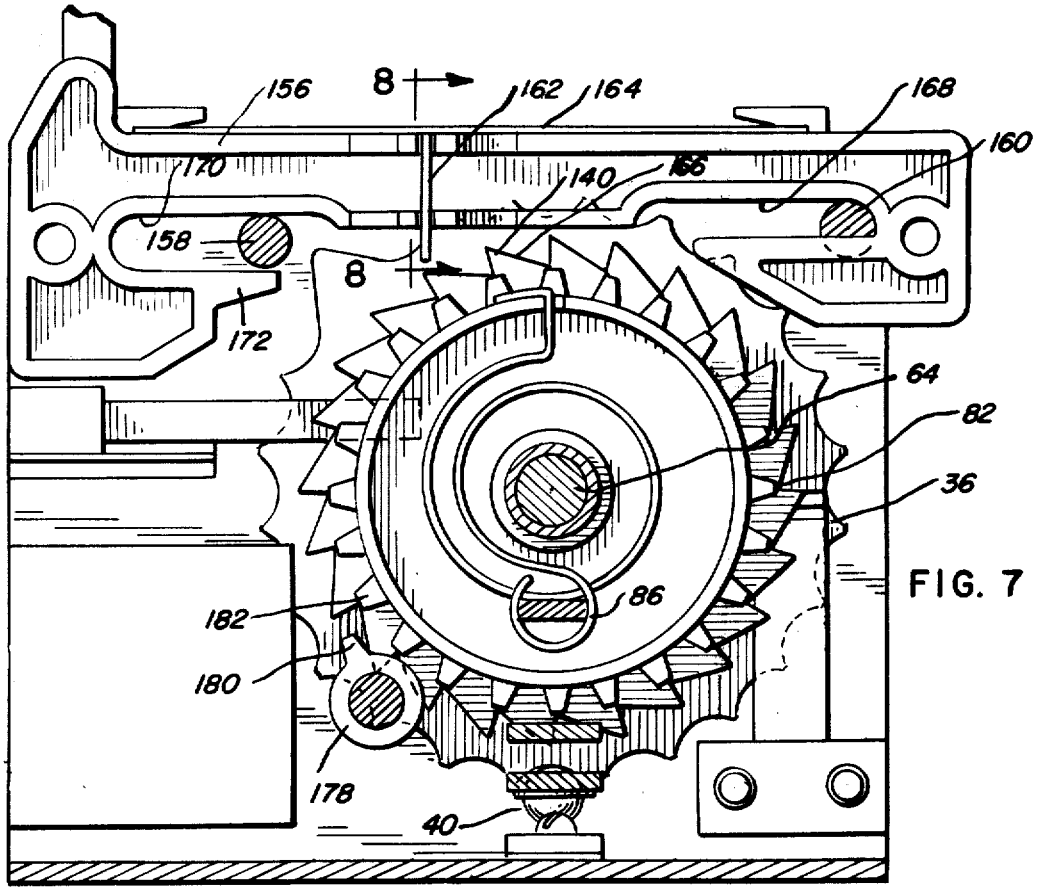
FIG. 7

FIG. 9
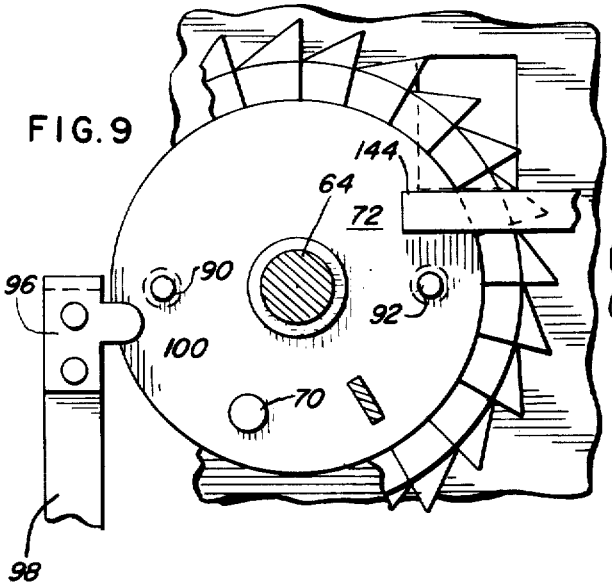
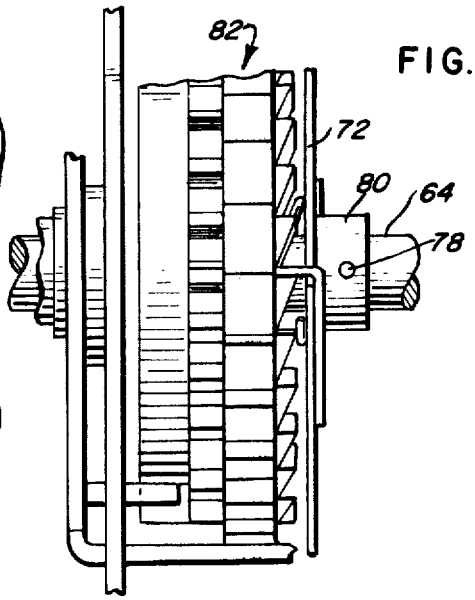
FIG. 10
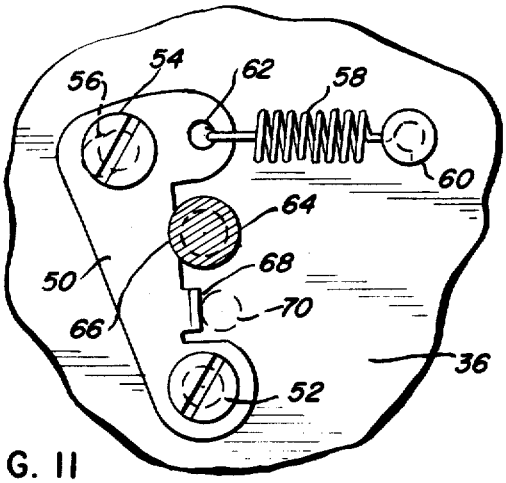
FIG. 11
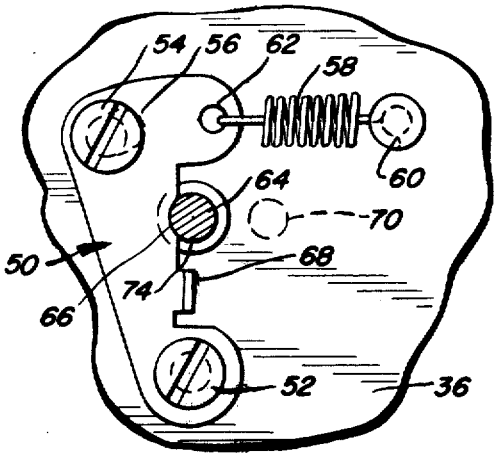
FIG. 12
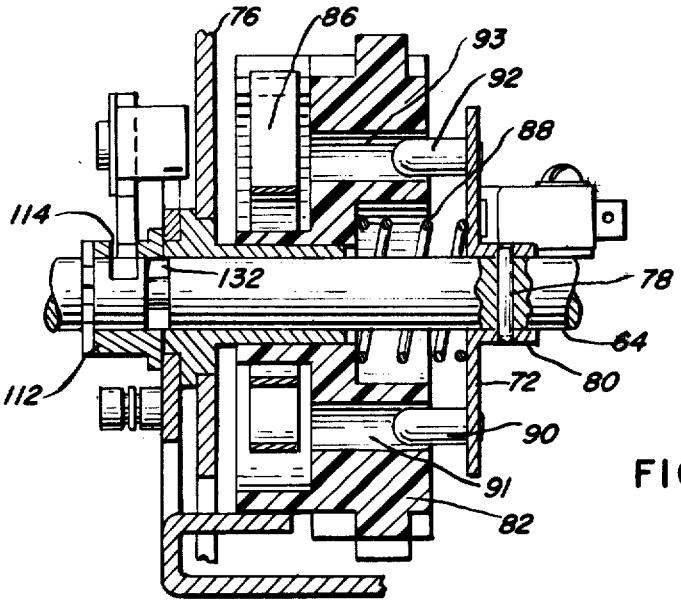
FIG. 13

MECHANICAL COUNTER

Matter enclosed in heavy brackets [ ] appears in the original patent but forms no part of this reissue specification; matter printed in italics indicates the additions made by reissue.

BACKGROUND OF THE INVENTION

The present invention relates to an improved counter device and more particularly to a counter device that may be preset for a fixed number of counter operations. Also included is a mechanism to bypass the counting mechanism of the counter device.

Counter devices are utilized to control the operation of many types of machines. For example, counters are used on copying machines. A typical prior art counter is disclosed in U.S. Pat. No. 3,710,079 issued Jan. 9, 1973 to W. O. Cralle, Jr., et al.

A desirable feature of such counter devices is the capability of setting the counter at a desired number and then providing a display which continuously shows the number of copies made or to be made. Another feature desired in a counter is a capability of automatic reset of the counter device. A further feature which is desired in a counter device is an override control for initiating or permitting operation of the device without a counting function. Of course, simplicity and reliability are also features desired in mechanical counters.

SUMMARY OF THE INVENTION

In a principal aspect, the present invention comprises an improved mechanical counter device having an indexing member associated with a detent and a register member associated with a counter advance mechanism. The indexing member is preset to a desired position and the register member then operates to indicate the number of operations sensed or yet to be sensed by the counter. The counter device thus includes a pawl and ratchet mechanism which is operated by an external input to the device. The pawl and ratchet mechanism advances the register member to a position of coincidence with the indexing member of the counter. Upon reaching a position of coincidence with the preset indexing member, the control button automatically releases the pawl and ratchet mechanism thereby disconnecting the operating switch associated with the counter device and automatically resetting the register member push button to a null position.

An override or bypass for the counter mechanism is also provided. The override or bypass control is associated with the register member.

It is thus an object of the present invention to provide an improved mechanical counter device.

It is a further object of the present invention to provide a mechanical counter device wherein the counter output may be preset by one control, and operation of the counter may be initiated by a separate control.

One further object of the present invention is to provide a mechanical counter device which operates with a single pawl and ratchet mechanism that becomes operative upon initiation of a push button, the push button also acting as an indexing device indicating the number of operations recorded by the counter.

Still another object of the present invention is to provide a mechanical counter device including an override mechanism which bypasses the counter function of the device.

Another object of the present invention is to provide a mechanical counter device with a minimum number of mechanical and moving parts that is compact in size and easy to manufacture.

These and other objects, advantages and features will be set forth in the detailed description which follows.

BRIEF DESCRIPTION OF THE DRAWING

In the detailed description which follows, reference will be made to the drawing comprising the following Figures:

FIG. 1 is a plan view of a dial associated in a first embodiment of the counting device of the present invention;

FIG. 3 is a top plan view of the assembled counting device shown in FIG. 2 including various options that may be associated with the device;

FIG. 4 is a side elevation of the counting device of FIG. 2;

FIG. 5 is a rear elevation of the counting device of FIG. 2;

FIG. 6 is another rear elevation of the counting device of FIG. 2;

FIG. 7 is a cross sectional view of the counting device shown in FIG. 3 taken along the line 7—7;

FIG. 9 is a partial cross sectional view of the ratchet and pawl mechanism of the counting device taken substantially along the line 9—9 in FIG. 3;

FIG. 10 is a side view of the ratchet and pawl mechanism shown in FIG. 9;

FIG. 11 is an enlarged partial view of the pawl locking mechanism for the indexing member of the counting device;

FIG. 12 illustrates the pawl locking mechanism of FIG. 11 in another position;

FIG. 13 is an enlarged partial cross sectional side view of the internal mechanism of the counting device;

DESCRIPTION OF THE PREFERRED EMBODIMENT

Figure 2:
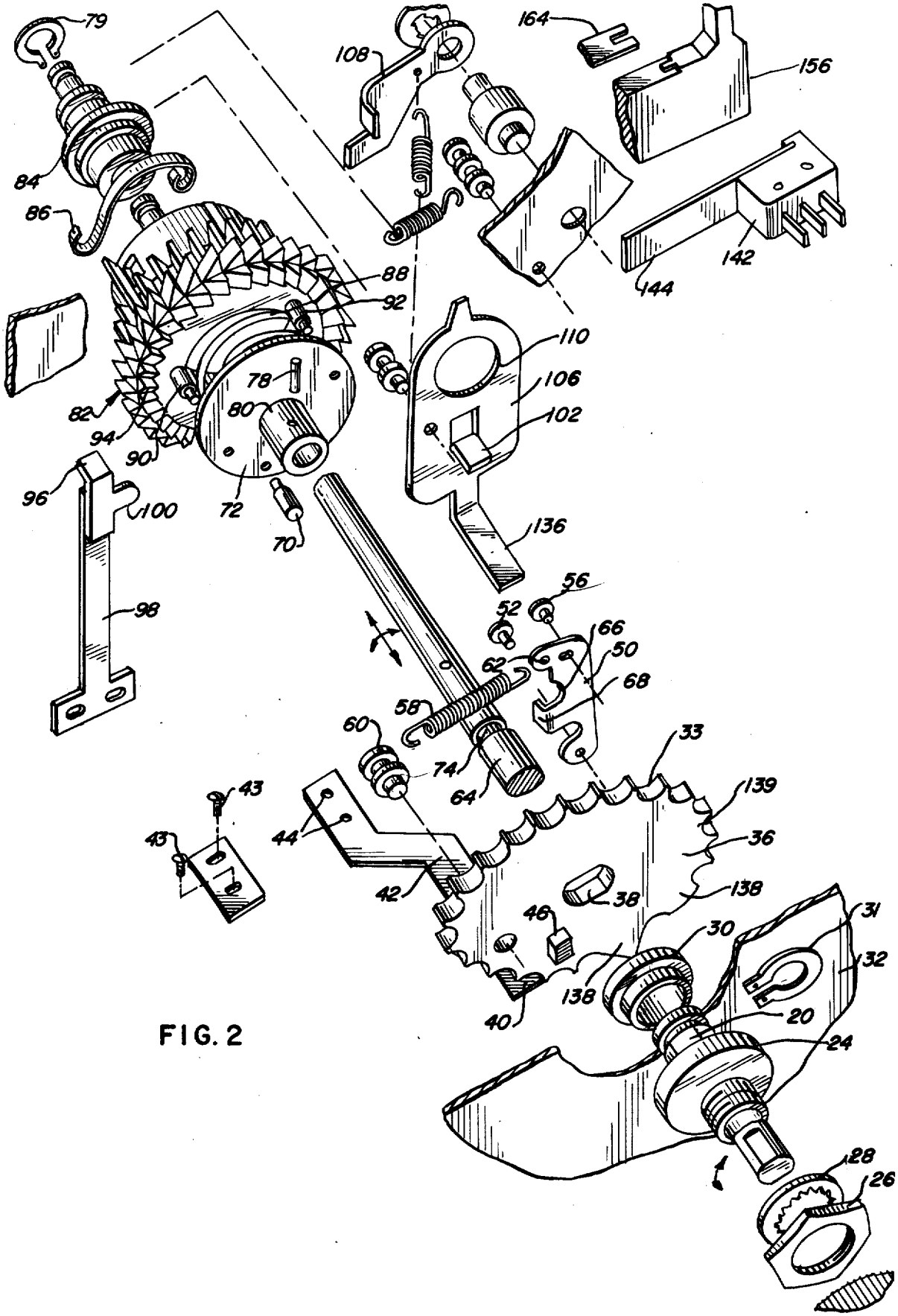
FIG. 2 is an exploded perspective view of the counting device of FIG. 1.

FIGS. 1 through 13 of the description refer to a first embodiment of the invention. FIGS. 14 through 18 relate to an alternative embodiment. Various permutations and combinations of the structure of the first embodiment and the second embodiment are possible and some examples will be discussed.

FIG. 1 illustrates the front dial of the counting device of the present invention. Operation of the device is initiated by rotating the outer annular ring or indexing member 10 to the desired setting indicating, for example, the number of copies or other operations to be performed by the apparatus controlled by the counting device of the present invention. Indicia 12 are provided on 10 to indicate the setting of the ring 10 relative to a fixed setting point 14 on a cabinet panel or housing 22 for the apparatus of the present invention.

The annular ring 10 is rotatable independent of an internal push button or register member 16. Thus, for example, setting the digit or indicia 12 for the number "6" adjacent the setting point 14 will also result in initial alignment of the arrow 18 on push button 16 with the digit 6.

To commence operation of the counting device, the push button 16 is depressed or translated longitudinally. The depressed push button 16 then rotates in incremental steps in the counterclockwise direction. An incremental step takes place as each single operation is sensed by the counting device. When arrow 18 on push button 16 moves counterclockwise from a position adjacent the indicia 12 for the number 1 as a result of incremental counterclockwise rotation of the push button 16, the depressed push button 16 moves outward or in an opposite sense from its depressed position. Subsequently, the push button 16 rotates in a clockwise direction to align the arrow 18 with the setting point 14. The push button 16 may then be depressed to repeat the sequence of operations. Of course, it is also possible to readjust the ring 10 to a different setting.

In the embodiment shown in FIG. 1, it is also possible to rotate the ring 10 in a clockwise direction, thereby aligning the indicia "C" with the setting point 14. As a result of engaging the counting device in this position, the counting and indexing mechanism associated with the device becomes inoperative. Thus, depression of the register member or push button 16 will initiate operation of a mechanism controlled by the counter device. Operation of the mechanism will then continue until the indexing member or annular ring 10 is moved from the C position so that other indicia 12 will be adjacent the setting point 14. In this manner, for example, unlimited copies are produced when the counting device of the present invention is incorporated with a copying machine.

Reference will be now made to FIGS. 2 through 13 wherein the functions previously described will be explained in terms of the specific structure of the invention. The indexing member 10 is attached to an annular shaft 20 to rotate coincidentally therewith. The annular shaft 20 is mounted on a panel 22 by means of an appropriate bushing 24 and cooperatively threaded fastener 26 and washer 28. The bushing 24 also cooperates with a second bushing member 30 and locking washer 31 to retain the annular shaft 20 in fixed, though rotatable position, in the front panel 32 of a main housing 34 for the counting device. The shaft 20 is keyed to a detent wheel 36 through the double D shaft opening 38 at the center of the detent wheel 36. The detent wheel 36 includes a single detent 33 associated with each indicia 12 on the indexing member 10.

The detent wheel 36, though rotatable with shaft 20 and indexing member 10, is held in a detent position by cooperation with a detent ball 40 attached to the end of a spring member 42. The spring member 42 is, in turn, attached to housing 34 by appropriate fastening means 43 through attachment openings 44 at one end of the spring member 42.

Incorporated with the detent wheel 36 and projecting from a side thereof is an integral projection 46. Projection 46 is adapted to engage a cooperative tab 48 in FIG. 4 to prevent unlimited rotation of the detent wheel 36 in either direction.

Attached to the opposite side of the detent wheel 36 is a shaft locking mechanism including a spring biased pawl 50 which is illustrated in detail in FIGS. 11 and 12. The pawl 50 is fixed to pivot about a mounting rod or pivot member 52 in wheel 36. A second mounting rod or pivot member 54 also fastens the pawl 50 to the detent wheel 36 and extends through a slot 56 in pawl 50 to limit the pivotal movement of the pawl 50. A biasing spring 58 is connected between a stud 60 extending from the detent wheel 36 and an opening 62 in the pawl 50.

Normally, the pawl 50 is biased against the outside surface of a shaft 64 which is concentric with the annular shaft 20. A curved camming surface portion 66 of the pawl 50 thus engages against the shaft 64. The camming surface portion 66 of the pawl 50 may also be engaged with an annular slot 74 in shaft 64 whenever shaft 64 is translated to an appropriate position. Further translation of shaft 64 in either direction is thus prevented.

A projecting tab 68 of pawl 50 cooperates with a post 70 projecting from a plate 72 that will be described in more detail below. The pawl 50 can be pivoted against force of the spring 58 by operation of rod 70 to become disengaged from the annular slot 74 defined in the shaft 64.

The shaft 64 extends longitudinally through the front of the housing 34, through the annular shaft 20 which serves as one bearing surface for the shaft 64, and is connected with the register member or push button 16. The opposite end of the shaft 64 extends through a back panel 76 of the housing 34 for cooperation with various switching mechanisms and other mechanisms to be described in more detail below. The shaft 64 is rotatable about its axis and also translatable in the longitudinal direction along its axis. The amount of translation associated with the shaft 64 is in the embodiment disclosed equal to the distance which the push button 16 travels from an undepressed to a depressed position. Travel is limited by a locking washer 79 and the push button 16 cooperating with ring 10.

As shown in FIG. 13, the shaft 64 is fixed to the plate 72 by a pin 78 which extends through a hub 80 of plate 72 and the shaft 64. The plate 72 thus moves coincidentally with the shaft 64 in both a rotational and translational sense.

A ratchet and drive member 82 is mounted for rotation on shaft 64. The ratchet member 82 also cooperates with a bushing 84 and is thereby attached to the housing back panel 76. Thus, the ratchet 82 is rotatable on the shaft 64, though not translatable therewith.

In the embodiment illustrated in FIGS. 1 through 13, a spring 86 as more particularly illustrated in FIG. 7 is connected between the rear or back panel 76 and the ratchet member 82 to bias the ratchet member 82 in a counterclockwise sense as viewed from the direction of FIG. 7. This would be clockwise sense as viewed in FIG. 1.

Interposed between the plate 72 and the ratchet member 82 is a coil spring 88. Spring 88 biases the plate 72 and thus the shaft 64 longitudinally toward the front panel 32. In this manner, the push button 16 is maintained in a null position flush with the annular ring 10 as illustrated in FIG. 3. Posts 90 and 92 projecting from the back side of the plate 72 engage in openings 91 and 93 provided in the ratchet member 82 so that the plate 72 and ratchet member 82 will rotate in unison. This arrangement of posts 90, 92 in combination with the spring 88 permits both rotational and translational movement of the plate 72 and shaft 64 while at the same time permitting only rotational movement of the ratchet member 82.

The ratchet member 82 includes ratchet teeth 94 cooperative with a main pawl 96 attached to the housing 34 by spring biased leaf 98. A tab 100 projecting from the main pawl 96 cooperates with plate 72 to permit disengagement of the pawl 96 from the teeth 94. Thus, as the ratchet member 82 rotates in the counterclockwise direction illustrated in FIG. 2, the pawl 96 will slide over and engage succeeding ratchet teeth 94. Engagement between the teeth 94 and pawl 96 occurs, however, only when the plate 72 has been translated to a position most nearly adjacent the ratchet member 82 by operation of the push button 16 which is depressed to drive the shaft 64 inward. As the shaft 64 is driven inward, the pawl 50 associated therewith and described above with regard to FIGS. 11 and 12 will operate so that the slot 74 is engaged by the pawl 50. This locks the shaft 64 and attached plate 72 in a position of proximity to the ratchet member 82. Thus, the tab 100 which is normally engaged by the plate 72 permits movement of the pawl 96 to engage the teeth 94.

In operation then, as described initially, the indexing ring 10 is rotated to set the detent wheel 36 at a desired position. When the detent wheel 36 is set at a desired position, the pawl 50 is simultaneously rotated therewith. Thus, the pawl 50 which is normally engaged by stud 70 is rotated out of position for engagement with the stud 70 to a position, for example, as illustrated in FIG. 9.

Then, it is possible to depress the register member or push button 16 to enable the pawl 50 to engage the slot 74. The button 16 is retained in the depressed position permitting operation of the ratchet member 82 and operation of the counting mechanism of the invention.

Counter input is provided to the mechanism of the invention by any of a number of structures for driving the ratchet and drive member 82. For example, a gear mechanism 178 can be provided to incrementally drive the ratchet 82. As the ratchet 82 is driven in incremental steps indicating separate counted operations, the pawl 96 insures that the advance of each increment is retained.

Upon movement just beyond the initial indicia, i.e., the number 1, as a result of the counterclockwise rotation of the ratchet 82, post 70 engages the pawl 50 causing the pawl 50 to be released from the slot 74. When this happens, the shaft 64 and plate 72 are biased outward by spring 88. This causes the tab 100 to be engaged by the plate 72 thereby releasing the pawl 96 from the teeth 94. The ratchet member 82 consequently has no mechanism to retain it in its driven position and is returned to its original or null position by the force of the spring 86. When the ratchet member 82 is rotated by the spring 86, the ratchet member 82 is engaged with plate 72 through studs 90, 92. Studs 90, 92 cause the plate 72 as well as the shaft 64 and push button 16 to rotate in a clockwise sense to the original or null position of the switch. The indexing member or annular ring 10 may be then reset and the push button 16 may again be depressed to provide for continued operation of the mechanism.

In the embodiment illustrated in FIGS. 1 through 13, the ratchet member 82 is limited in its clockwise movement by a tab 102 illustrated in FIG. 4 projecting through a window 104 in panel 76. The tab 102 may alternatively be integral with the panel 76. In this instance, however, the tab 102 is part of a mechanism associated with a feature of the counter illustrated in FIGS. 1 through 13 that permits disengagement or bypass of the counting function of the device. Thus, the tab 102 is incorporated as part of a bracket member 106.

So far, there has been provided a detailed description of the internal counter mechanism of the first preferred embodiment of the invention. The description will now relate to the bypass mechanism which can be incorporated with the structure shown in the first embodiment.

The bypass mechanism is generally included on the back side of the panel 76. The principal component parts of the bypass mechanism include the bracket member 106 and a shaft locking member 108. The bracket member 106 includes an opening 110 to permit the bracket member 106 to fit over and around the shaft 64 and bushing 84. The bracket member 106 is rotatable about bushing 84 and is retained against the bushing 84 that projects through the bracket 76 by a flanged spool 112 as shown in FIGS. 4 and 11. The spool 112 includes a slot 114 that permits access to shaft 64.

The bracket member 106 is normally maintained in a clockwise biased position (as viewed in FIG. 6) by a spring 116 which connects between a stud 118 on bracket 106 and a stud 124 on the back panel 76. The tab 102 engages the side of window 104 to prevent or limit movement of the bracket 106 in the clockwise direction.

The shaft locking member 108 is also mounted for pivotal motion on a pivot mount 120 attached to the panel 76. A spring 122 connected between the locking member 108 and the stud 124 biases the shaft locking member 108 in the clockwise direction.

The shaft locking member 108 includes a tab 126 which cooperatively engages a cam surface 128 extending from the bracket member 106. When the bracket member 106 is aligned in the manner illustrated in FIG. 6, the cam surface 128 upon engagement with tab 126 moves the shaft locking member 108 in a clockwise direction as shown in FIG. 2 (counterclockwise in FIG. 6) in order to lift a locking tab 130 of member 108 partially out of slot 114 and completely out of position for engagement with annular slot 132 of shaft 64. Thus, the locking tab 130 cannot interfere with movement of the shaft 64 in longitudinal direction.

However, upon movement of the bracket member 106 in the clockwise direction as illustrated in FIG. 2 (the counterclockwise direction as illustrated in FIGS. 5 and 6) the cam surface 128 moves permitting the counterclockwise movement of the shaft locking member 108 and consequent engagement of the locking tab 130 with annular slot 132 when shaft 64 and button 16 are moved longitudinally to the depressed position.

Movement of the bracket 106 in the stated manner is effected by moving the detent wheel 36 in the clockwise direction as illustrated in FIG. 2. This causes a projection 134 of detent wheel 36 as illustrated in FIG.

5 to engage arm 136 of bracket member 106 and move the bracket member 106 in the clockwise direction as illustrated in FIG. 2.

Note that the tooth 138 (illustrated in FIG. 5) of the detent wheel 36 associated with movement of the detent wheel to the C position is larger than the other teeth 139 on the wheel 36. This provides appropriate feel to the operator of the counting device to forewarn the operator that the device is being put into a special mode of operation. Also, it is noted that the window 104 through which the arm 136 and tab 102 extend, restricts further clockwise movement of the ratchet wheel 36.

In operation then, movement of the annular ring 10 to the C position permits the locking tab 130 to become effective. When this occurs, the tab 130 will be in position to engage the slot 132 of the shaft 64 previously described upon depression of the push button 16 and longitudinal movement of the shaft 64. The locking tab 130 retains the push button 16 and shaft 64 in the locked or depressed position despite the fact that the stud 70 is maintained against the pawl 50. Thus, the push button 16 is locked in a depressed position. The counter mechanism will continue to operate until manually placed in the original indicia position having the numeral "1".

Note that the mechanism for advancing the ratchet member 82 is also adjusted or constructed to accomodate the C position of the detent wheel 36 just described. For example, the ratchet member 82 is normally advanced by a mechanism which engages the teeth 140 on the member 82. However, one or more teeth for driving the ratchet member 82 in the described C position are missing. Thus, the ratchet 82 will not be advanced by a counter input mechanism.

The counting device of the present invention operates to activate a switch upon depression of the button 16 and translation of the shaft 64. The switching operation may be effected in any of a number of illustrated ways. For example, a microswitch 142 may be mounted in some manner on the housing 34 with a switch blade 144 engaging the plate 72. Movement of the plate 72 will cause switching action by the microswitch 142.

Another switch mechanism is illustrated in FIGS. 4 and 6. There translation of the shaft 64 causes a spool 146 attached to the end of the shaft 64 to engage a bar 148 and pivot the bar 148 about its pivot member 150. The bar 148 drives a solenoid or other switching mechanism 152.

This arrangement may also be used to drive the shaft 64. That is, the solenoid 152 could be actuated whenever the counter device is returned to its null set position. The solenoid 152 through action of the bar 148 on shaft 64 would then initiate operation of the counter mechanism by automatically "depressing" or translating the shaft 64.

This arrangement could be used in a copying machine to provide a fixed number of copies of a multi-page document. That is, the initial setting of the counter would determine the number of copies of the multi-page document. The first page would then be fed into the copier for duplication of the required number of copies. Upon completion of making the required number of copies, the counter mechanism would return to the null position. Simultaneously, the next page in the multi-page document would be fed into the copier and the solenoid 152 would also actuate the shaft 64 to initiate operation of the copier for the required or set number of operations. Such recycling would continue until every page of the multi-page document had been copied the required number of times.

There are numerous other possible switching mechanisms which can be operated by the translational movement of the shaft 64. The examples given are therefore not considered limiting.

FIG. 7 illustrates a mechanism for advancing the ratchet wheel 82 in incremental steps. As previously mentioned, when the detent wheel 36 is set at a desired position the ratchet wheel 82 must be advanced to rotate the register member 16 in incremental steps. This register process is accomplished by rotation of the ratchet member 82.

Figure 8:
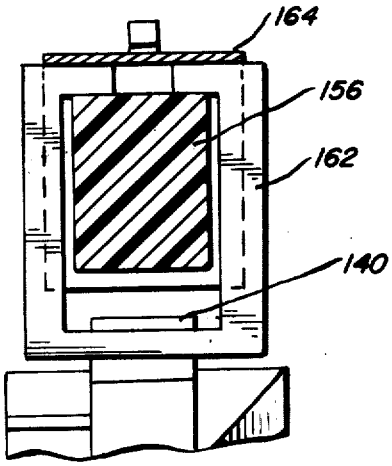
FIG. 8 is a cross sectional view of the ratchet driving mechanism of the counting device taken substantially along the line 8—8 in FIG. 7.

The advance mechanism for the member 82 includes an integral drive bar 156 which is slidably mounted on rods 158 and 160 that interconnect the front panel 32 and back panel 76 of the housing 34. Projecting downwardly in a slot in the bar 156 is a driving member 162 which is held in position by a biasing leaf spring 164. FIG. 8 is a cross-sectional view of member 162. As illustrated, member 162 is an open, ring-shaped, flat plate member adapted to slide in a peripheral slot 165 in bar 156.

As the bar 156 is translated in the right-hand direction in FIG. 7, the driving member 162 engages a tooth 140 and rotates the ratchet wheel 82 in a clockwise sense as viewed in FIG. 7. The teeth 140 are particularly shaped to engage the driving member 162 and include a sloped surface 166 over which the driving member 162 will slide subsequent to an incremental advance of the ratchet wheel 82. As the driving member 162 slides over the surface 166, it is forced upwardly by that surface 166 against the biasing force of spring 164. Upon reaching the point of a tooth 140, the driving member 162 assumes its original position illustrated in FIG. 7.

The bar 156 includes longitudinal slots 168 and 170 which define the travel of the bar 156 in both directions. The lower leading edge of the bar 156 includes a shaped tooth locking member 172. Tooth locking member 172 prevents movement of the ratchet wheel 82 for more than one incremental advance upon engagement of the drive member 162 with tooth 140. In other words, the next adjacent tooth to the one being impinged upon by driving 162 is engaged by the tooth locking member 172 to prevent undesired additional incremental advance of the ratchet wheel 82 without first having the bar 156 returned to its pre-driving position as illustrated in FIG. 7.

The bar 156 is normally retained in the position illustrated in FIG. 7, by a spring 174 in FIG. 3. Driving the bar 156 against the force of spring 174 is provided by operation of the machine controlled by the counting device. For example, a copying machine will provide a mechanical input and motion to the counter bar 156 as each copy is produced by the machine.

It is also possible to advance the ratchet wheel 82 with another mechanism shown in FIG. 7. The additional mechanism is a gear 178 having a single tooth 180. The gear 178 is mounted for rotation in the panel 76. With each revolution of the gear 178, the tooth 180 engages cooperating teeth 182 of wheel 82 and advances the ratchet wheel 82 one incremental step.

Reference is now made to FIGS. 14 through 18 which illustrate a second embodiment of the invention. Parts common to the embodiment of FIGS. 1–13 have like numbers.

Figure 14:
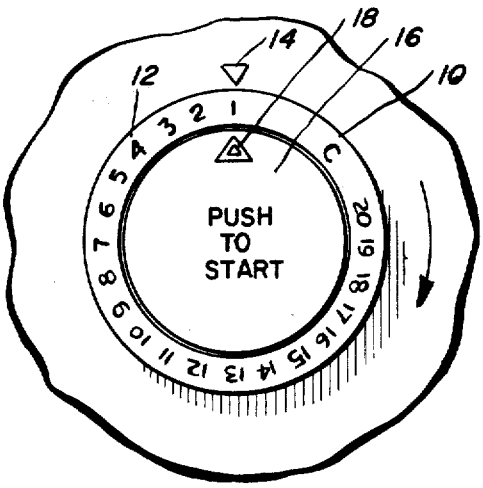
FIG. 14 illustrates a dial arrangement for a second preferred embodiment of the invention.
Figure 15:
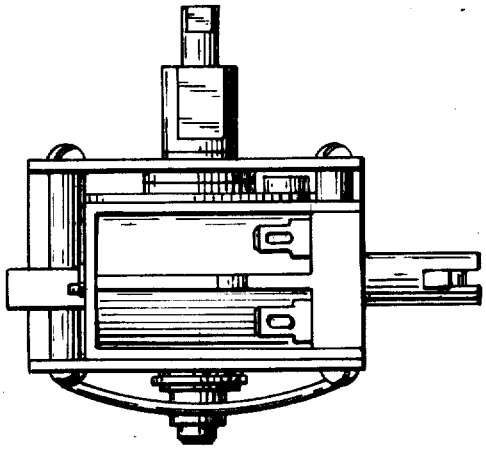
FIG. 15 is a top plan view of the counting device of FIG. 13 including a solenoid that actuates the advance mechanism of the counter device.

In FIGS. 14 through 18, reference is first directed to FIG. 14 which illustrates the face of the counter dial. Setting of the annular outside or indexing ring 10 is accomplished by rotation of the ring 10 in the clockwise direction. Once the setting is made, and the center button 16 is depressed, the inner button or register member 16 will be rotated incrementally in the clockwise direction and will be returned in a counterclockwise sense to the null position.

Thus, the counter mechanism illustrated in FIGS. 14 through 18 operates in a reverse sense relative to the counter illustrated in FIGS. 1 through 13. This reversal of direction is accomplished merely by reversing the detent wheel 36, ratchet wheel 82 and other components of the device.

Another feature which is different from that in the first embodiment relates to the bypass or continuous counting feature associated with the counter embodiment shown in FIGS. 14 through 18. To place the device in a bypass or continuous counting sequence, rotation of the outer annular or indexing ring 10 is continued in the same direction as indexing a set number. This is to be contrasted with the first embodiment of FIGS. 1–13 wherein the bypass mechanism is associated with movement of the ring 10 in the opposite direction from the direction required for a set number.

Bypass or continuous operation of the counter is accomplished by removing teeth 140 in the ratchet wheel 82 associated with input to the ratchet wheel 82 at the position associated with the continuous setting C. In other words, the ratchet wheel 82 will have twenty teeth for advance of the wheel through the first twenty positions. Positions twenty-one and the following positions of wheel 82 will not include any teeth. In this manner, input to the counter is not registered and the counter is being maintained in a so-called "on" condition by pawl 50.

Because of this arrangement for continuous or bypass operation of the counter, it is no longer necessary to have the bypass mechanism described with the previous embodiment. In other words, when the continuous operation position is maintained in the same sense as the increasing indicia settings, removal of driving means for the ratchet wheel 82 is sufficient for continuous operation.

Figure 18:
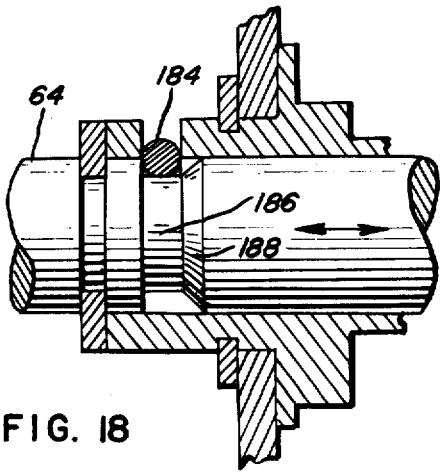
FIG. 18 is a cross-sectional view illustrating the spring retaining mechanism for indexing the shaft of the counting mechanism of the present invention.

A few additional features of the invention are also illustrated in FIGS. 14 through 18. For example, FIGS. 15, 16, 17 and 18 illustrate a biasing wire 184 retained on the back side 76 of the housing 34. This biasing wire 184 normally engages a sloped annular slot 186 in the shaft 64. Upon depression of the center push button 16, the shaft 64 travels to the left as illustrated in FIG. 18. The wire 184 then rides up an inclined surface 188 defined in the annular slot 186. This gives the push button a click or snap action feel. In other words, depression of the push button 16 requires some effort to overcome the force of spring 184. The push button 16 thus requires a positive action or movement from an undepressed to a depressed position.

Figure 16:
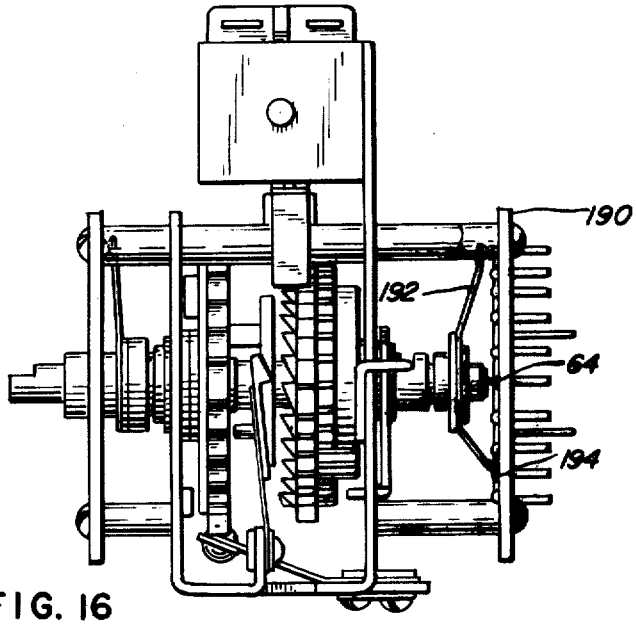
FIG. 16 is a side plan view of the counting device of FIG. 13 in combination with a single pole multi-position switch, to provide a discrete electrical output at each position of the register mechanism.
Figure 17:
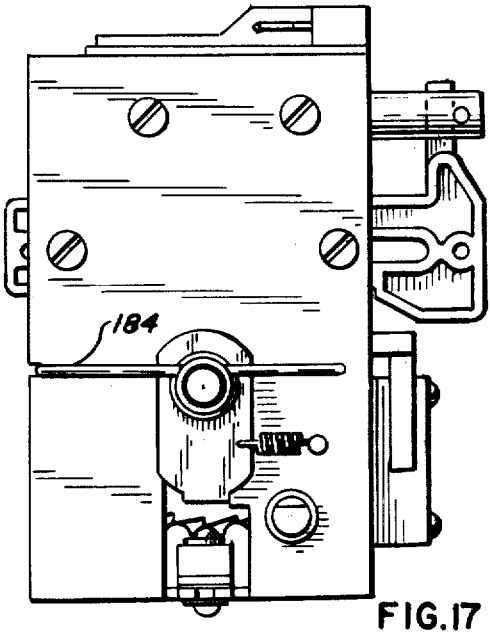
FIG. 17 is a rear elevation of the device shown in FIG. 15.

Another feature of the present invention is illustrated in FIG. 16. There a multi-position selector switch mechanism 190 is shown attached to the outside end of shaft 64 and panel 76. A contactor/commutator blade 192 is attached to shaft 64 and incrementally engages separate contacts 194 on panel 76 to make and break a circuit coincidentally with the operation of the indexing mechanism associated with the counter. The selector can thus operate a digital output through the mechanism of the counting device of the invention. Note that lateral movement of shaft 64 engages and disengages blade 192 with contacts 194 so that no contact is made whenever shaft 64 is in the null position.

Therefore, while in the foregoing there has been set forth various embodiments of the present invention, it is to be understood that the invention shall be limited only by the following claims and their equivalents.

What is claimed is:

1. A mechanical counter device comprising, in combination:

an indexing member positionable to a desired set detent position by movement in a first sense;

detent means movable in unison with said indexing member;

detent engaging means fixed relative to said detent means and cooperative therewith to enable positioning said indexing means to the desired set detent position;

a register member normally in a null position and positionable from said null position in a second sense to an active position, said second sense being distinct from said first sense, said register member also positionable in said first sense by a counting mechanism;

register member locking means fixed in position relative to movement of said register member in the second sense and positionable in unison with said detent means;

receiving means for said locking means, said receiving means attached to move in unison in the second sense with said register member, said receiving means engageable with said locking means when said register is moved to the active position.

unlocking means attached to the register member and engageable with said locking means when said register member is in the null position to thereby release said locking means from said lock receiving means;

means for driving the register member including said counting mechanism in the first sense from a non-registered position to the registered position; and means for biasing the register member toward the null position.

2. The counter device of claim 1 including means attached to said register member for returning said member from a registered null position corresponding to a set detent position of said indexing member to an unregistered zero index null position.

3. The counter device of claim 1 including switch means responsive to movement of said register member in the second sense direction.

4. The counter device of claim 1 including stop means to limit the travel of said indexing member.

5. The counter device of claim 1 wherein said means for driving said register member including said counting mechanism includes a pawl and ratchet mechanism for incrementally driving said register member in said first direction.

6. The counter of claim 5 wherein said pawl and ratchet mechanism comprises a movable ratchet wheel cooperatively engaged with said register member, a pawl fixed relative to said ratchet wheel and biased toward engagement with said ratchet wheel, said pawl being held out of engagement with said ratchet wheel by a plate member, said plate member being attached to said register member and engaged with said pawl whenever said register member is in the null position.

7. The counter device of claim 1 including means for rendering said means for biasing the register member toward the null position inoperative.

8. The counter device of claim 7 wherein said means for rendering said biasing means inoperative comprises a cam member for engaging and holding said register member in the active position; and linkage means between said detent means and said cam member, for operating said cam member upon appropriate positioning of said detent means in a locking detent position.

9. The counter device of claim 7 including means for simultaneously rendering said means for driving the register member inoperative whenever said biasing means is rendered inoperative.

10. A mechanical counter device comprising, in combination:

a housing;

a shaft mounted for rotation and translation in said housing;

a register member fixed to said shaft for coincident rotational and translational movement therewith;

a rotational drive mechanism in said housing for driving said shaft in a rotational sense in incremental steps;

an indexing member mounted in said housing and manually rotational in incremental steps coaxially with said register member, said indexing member including means cooperative with said housing to maintain said indexing member in a manually set rotated position, said register member and indexing member having at least one relative null or zero set position;

first biasing means for biasing said shaft in one sense from said housing, said shaft being manually translatable to a retracted position in the opposite sense against the force of said first biasing means; and shaft locking means for engaging said shaft to prevent translational movement thereof when said register member and indexing member are out of a relative zero set position whereby the indexing member may be set to a position which is a desired number of incremental steps from a zero set position, and said register member may be manually operated against said biasing force to effect locking of said shaft by said shaft locking means, said drive mechanism then being operable to drive the shaft and attached register member rotationally for an equivalent number of incremental steps to the setting of the indexing member, whereupon said members are again in a relative zero set position and said shaft locking means is disengaged from said shaft in order that said first biasing means may translate said shaft.

11. The counter device of claim 10 including second biasing means for rotationally biasing said shaft toward an original null position.

12. The counter device of claim 10 wherein said indexing member comprises a notched detent wheel coupled with a knob for rotating said detent wheel, and said housing includes a biased arm engageable with the notches of said wheel to hold said wheel in a manually set position.

13. The counter device of claim 10 wherein said indexing member includes a plate having a biased pawl attached thereto, said pawl being biased to engage said shaft, and said shaft includes a slot engageable by said pawl whenever said shaft is translated against said first biasing force.

14. The counter device of claim 13 including a projection fixed to said shaft and engageable with said pawl whenever said members are in a relative zero set position, whereby said pawl is disengaged from said slot to thereby release said shaft.

15. The counter device of claim 10 wherein said drive mechanism includes a ratchet wheel coupled to said shaft cooperable with a pawl fixed to said housing, whereby incremental advances of said ratchet wheel are maintained by said pawl.

16. The counter device of claim 11 wherein said drive mechanism includes a ratchet wheel coupled to said shaft cooperable with a pawl fixed to said housing whereby incremental advances of said ratchet wheel are made against the force of said biasing means and said pawl maintains said incremental advances by preventing rotation of said shaft to said original null position.

17. The counter device of claim 10 wherein said drive mechanism includes means for maintaining the shaft in the position of its last incremental advance, and means are attached to said shaft to release said means for maintaining whenever the members attain relative zero set or null positions.

18. The counter device of claim 10 including a ratchet wheel coupled to said shaft, a pawl fixed to the housing and cooperable with said ratchet wheel and a projection from said shaft engageable with said pawl when said shaft is extended by said first biasing means, whereby said pawl is disengaged from said ratchet.

19. The counter device of claim 10 including a spring coupled between said shaft and said housing for imparting a rotation to said shaft opposite in sense to the rotation imparted by the drive mechanism.

20. The counter device of claim 10 wherein said drive mechanism includes a drive member coaxial with said shaft, and rotatable on said shaft, said shaft being translatable relative to said drive member and including means for continuously coupling said shaft and drive member for coincident rotational movement.

21. The counter device of claim 10 wherein said drive mechanism includes a drive member which is keyed for rotation with said shaft, said drive member being mounted nontranslatably within said housing.

22. The counter device of claim 10 wherein said drive mechanism comprises a gear keyed on said shaft, said shaft being translatable relative to said gear.

23. The counter device of claim 10 wherein said indexing member includes an annular knob and said register member includes a knob within said annular knob.

24. The counter device of claim 10 including means projecting from said shaft for engaging switch means upon translation of said shaft.

25. The counter device of claim 10, including control means engaging said shaft for mechanically translating said shaft against the force of said first biasing means.

26. The counter device of claim 10 including an electrically responsive control device coupled with said shaft and effective to translate said shaft against the force of said first biasing means.

27. The counter device of claim 10 including a projection from said indexing member cooperative with said housing to limit the degree of rotation that may be imparted to said indexing member.

28. The counter device of claim 10 including means for maintaining said shaft in each position of incremental advance effected by the drive mechanism, and also including means on said shaft for simultaneously disengaging said means for maintaining and operating a separate switch mechanism whenever said members achieve a relative zero set position.

29. The counter device of claim 10 including a ratchet wheel keyed to rotate with said shaft, a pawl attached to said housing to engage said ratchet wheel, a separate switch device mounted on said housing, and a plate on said shaft to engage said pawl and switch simultaneously upon translation of said shaft to effect release of said pawl and a switching action by said switch.

30. The counter device of claim 10 including means for locking said shaft in the retracted position when said members are in a relative null position.

31. The counter device of claim 10 wherein said shaft includes a slot and said device includes a locking pawl mounted on said housing, means for biasing said pawl against said shaft, and linkage means coupling said pawl with said indexing member said linkage means normally maintaining said pawl out of contact with said shaft said indexing member being rotatable to a position to operate the linkage means and release said pawl to engage said slot whenever said shaft is translated to the retracted position.

32. The counter device of claim 10 including a biased pawl on said housing, a cam member engaged with said pawl to maintain said pawl in an inoperative position, said cam member including an arm responsive to rotation of said indexing member to a predetermined detent position, said pawl being released by said cam member to engage said shaft when said indexing member is in the predetermined detent position, said shaft including cooperative engaging means with said pawl to maintain the shaft in the retracted position.

33. The counter device of claim 10 wherein said drive mechanism includes a gear on said shaft and a reciprocating gear drive on said housing, said gear being responsive to advance a set number of incremental steps in response to each reciprocation of said gear drive.

34. The counter device of claim 10 wherein said drive mechanism includes a toothed gear keyed on said shaft and a reciprocating bar on said housing, said bar including a biased projection for engaging single teeth of said gear to advance said gear in a first rotational sense as said bar member is moved in a first linear sense, said projection being retractable against biasing force upon movement of the bar in the reverse linear sense.

35. The counter device of claim 10 wherein the drive mechanism includes a gear keyed to the shaft and a reciprocating bar on said housing for driving said gear, said bar including a depending pawl for engaging teeth of said gear, a leaf spring biasing said depending pawl into engagement with said teeth, a lower projection compatible with said teeth to insure incremental rotation of the gear in response to each reciprocal movement of the bar.

36. The counter device of claim 10 wherein said drive mechanism includes a gear keyed to said shaft and a second driving gear on said housing for driving the keyed gear.

37. The counter device of claim 10 including a contactor attached to said shaft and a plurality of contacts attached to said housing in position to engage said contactor in response to incremental rotation of said shaft.

38. The counter device of claim 10 including a contactor attached to said shaft and contacts on said housing, said contactor being positioned for electrical connection to said contacts by translation of said shaft to the retracted position.

*39. An improved counter device comprising, in combination:*

*a frame;*

*a locking bar mounted on the frame and biased toward a locked position;*

*a rotatable shaft mounted in the frame, said shaft including a slot to receive the locking bar in a locked position;*

*said shaft being translatable relative to said bar in a direction parallel to the rotation axis of the shaft between an engaged, locked position and a disengaged, unlocked position;*

*separate biasing means for normally biasing the shaft relative to the bar in a direction parallel to the rotation axis of the shaft toward the disengaged position;*

*drive means for rotating the shaft relative to the locking bar, said bar including means for cooperating with the drive means to disengage the bar from the slot whenever the bar is engaged in the slot and the bar and slot have been rotated with respect to each other from a set position to a null position.*

*40. The improved device of claim 39 wherein said locking bar is mounted on a separate indexing member, said indexing member in turn being coaxially mounted with the shaft.*

*41. The improved device of claim 39 wherein said shaft is attached to a register member, said locking bar is non-translatable and said shaft is translatable in a direction parallel with the axis of said shaft.*

*42. The improved device of claim 39 wherein said drive means for rotating the shaft is operative to rotate the shaft in incremental steps.*

* * * * *